July 5, 1966  P. HERNADI  3,259,166
FASTENER STRIP
Filed July 19, 1965  2 Sheets-Sheet 1
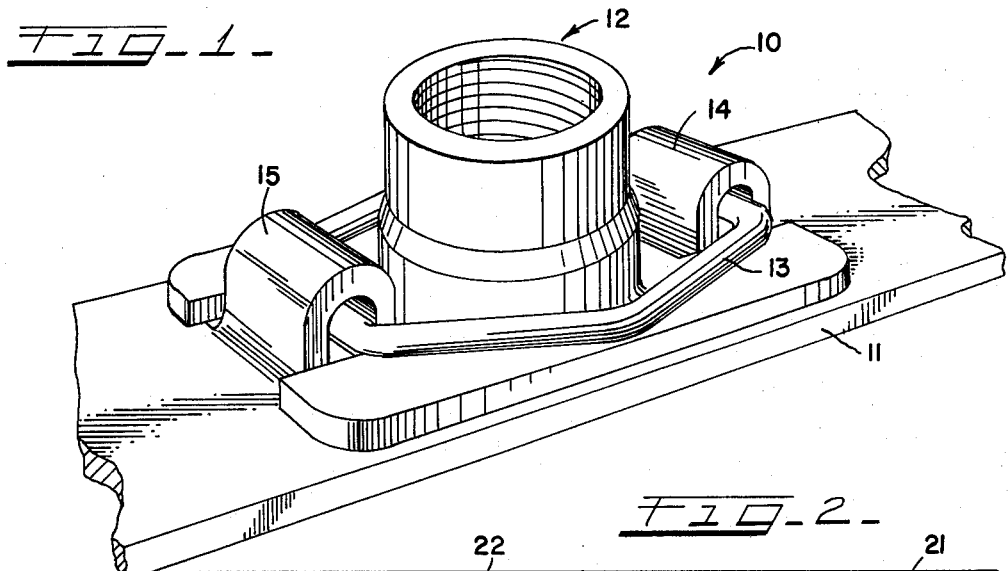
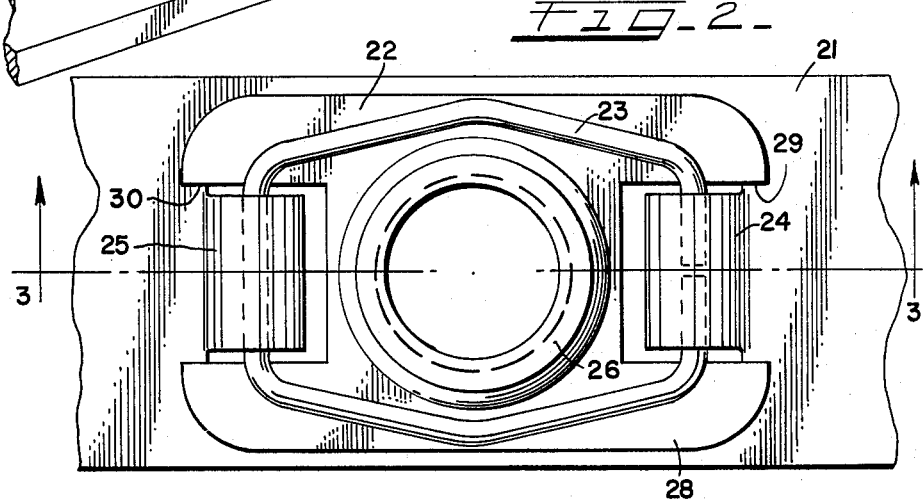
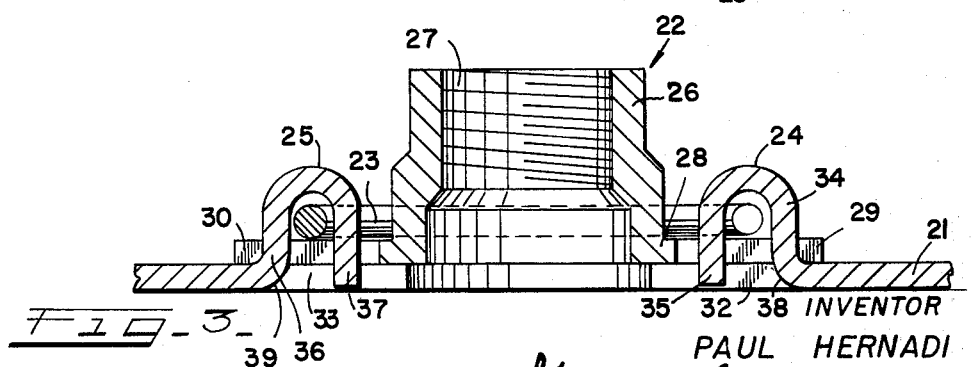
INVENTOR
PAUL HERNADI
BY Greist, Lockwood,
Greenawalt & Dewey ATT'YS.

July 5, 1966 P. HERNADI 3,259,166
FASTENER STRIP
Filed July 19, 1965 2 Sheets-Sheet 2
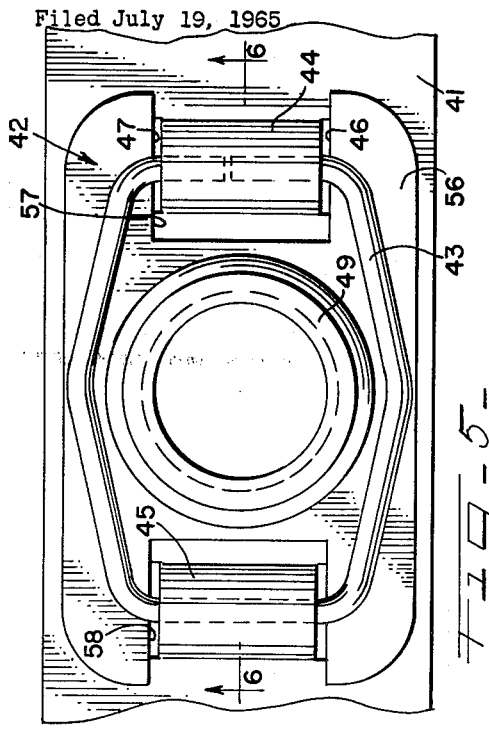
FIG-5-
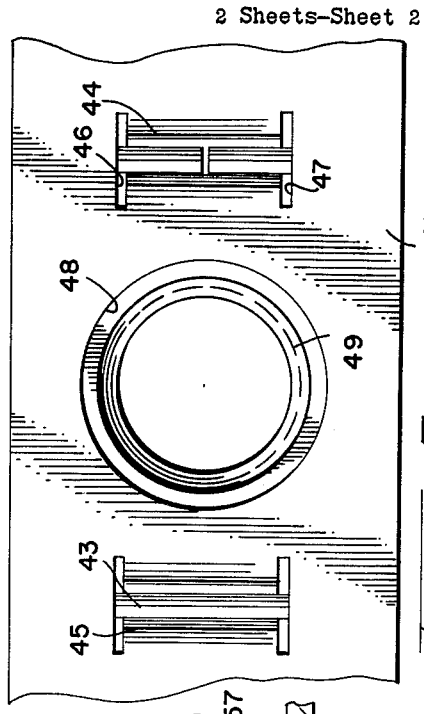
FIG-7-
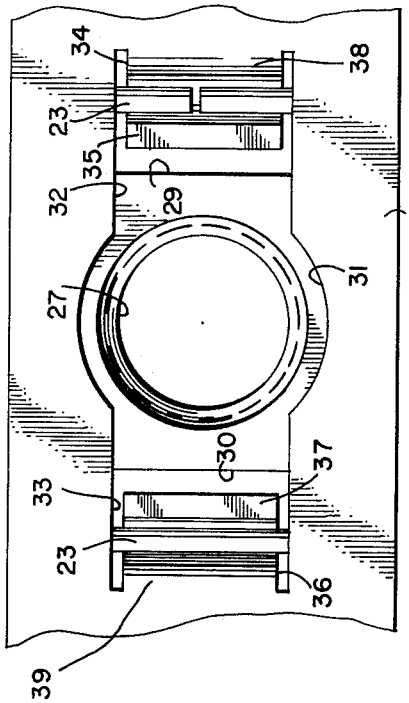
FIG-4-
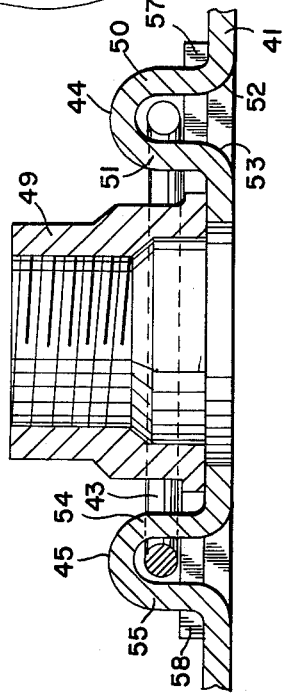
FIG-6-
INVENTOR
PAUL HERNADI
BY Greist, Lockwood,
Greenawalt & Dewey ATT'YS.

United States Patent Office 3,259,166
Patented July 5, 1966

3,259,166
FASTENER STRIP
Paul Hernadi, Torrance, Calif., assignor to VSI Corporation, Pasadena, Calif., a corporation of Illinois
Filed July 19, 1965, Ser. No. 472,958
7 Claims. (Cl. 151—41.76)

The fastener strip of the present invention is an improvement over the fastening system described and claimed in my copending application, Serial No. 372,892, filed June 5, 1964, of which this application is a continuation-in-part.

This invention relates to fastening systems in general, and more particularly is directed towards a fastener strip particularly adapted for use in joining structural parts or members together.

In the above-mentioned application, a strip of material is provided with retainers or lugs for mounting a plurality of fasteners such as a flanged nut in a non-rotatable and freely floatable manner, the assembly being of a lightweight design and providing good resistance to torque normally developed in fastening. The fastener strip of the present invention is of the same general description however contains an improved retention means providing a higher resistance to torque. Generally U-shaped retainer members are deformed out of the strip material to mount a fastener in a nonrotatable manner. In one embodiment the retainers are deformed out of the strip to provide an opening for the fastener also, with the free end of the retainer held in the plane of the strip to provide increased resistance torque. A second embodiment has a pair of generally U-shaped retainer members deformed from the plane of the retainer strip. Each U-shaped retainer has the legs of the U formed integral with the strip to provide additional resistance to torque.

For convenience of description the present device has been illustrated and will be described in connection with a flanged nut member, however, it is to be pointed out that it is equally applicable to all types of fasteners such as bolts and the like. The specific details and broad advantages of the present invention will be better comprehended upon a consideration of the objects achieved and a detailed description of the salient features of the invention.

It is an object of this invention to provide a new and improved fastener strip adapted to floatingly mount a fastener.

It is a further object of this invention to provide a new and improved fastener strip having a novel retainer means which provides increased resistance to torque.

It is a further object of this invention to provide a fastener strip wherein the retainer means is formed from a portion of the strip between side margins being deformed out of the strip proper to provide a simplified and economical mounting having increased resistance to torque.

It is a further object of this invention to provide a new and improved fastener strip of simplified design which is economical to manufacture when contrasted with prior art types and further is lightweight while providing increased resistance to torque.

Additional objects other than those specifically enumerated will become apparent in the course of the following description of some preferred embodiments while other modifications will be clearly apparent to the man in the art who reads the description and studies the drawings.

FIG. 1 is a fragmentary perspective view of a fastener strip embodying the principles of the present invention;

FIG. 2 is a top plan view of a fastener strip such as that illustrated in FIG. 1;

FIG. 3 is a longitudinal cross sectional view taken generally along the lines 3—3 of FIG. 2;

FIG. 4 is a bottom plan view of the embodiment of FIG. 2;

FIG. 5 is a top plan view of an embodiment such as is illustrated in FIG. 1 having modified retainer means from that shown in FIGS. 2–4;

FIG. 6 is a longitudinal cross sectional view of the embodiment of FIG. 5 taken generally along the lines 6—6 of FIG. 5; and FIG. 7 is a bottom plan view of the embodiment of FIGS. 5 and 6.

Referring now to FIG. 1, the fastener strip is represented generally by reference character 10 and includes basic elements of a strip member 11 having a fastener indicated generally at 12 held to the strip by a spring clip 13 co-operating with tab or retainer members 14 and 15 on the strip 11. The basic elements are the same for the system described in my copending application alluded to above. It will become evident that the improved design of the present invention has advantages by way of manufacturing and functional operation.

The embodiment illustrated in FIGS. 2–4 has the basic elements noted above, including a retainer strip 21 supporting a fastener 22 through a retainer clip 23 co-operating with retainer members 24 and 25. The fastener 22 illustrated comprises a tubular nut having an upstanding barrel portion 26 which is threaded along its inner wall at 27 for co-operation with a threaded bolt or stud (not shown). Fastener 22 is provided with a flanged base 28 having U-shaped slots 29 and 30 at opposite ends for disposition around three sides of the retainer members 24 and 25, respectively. The U-shaped slots are dimensioned so as to be loosely interfitted with the retainer members 24 and 25 permitting slight movement of the fastener 22 longitudinally and laterally of the retainer strip 21. The amount of movement in either direction may be designed to any desired practical limit depending upon the particular application.

The retainer strip 21 is provided with a central opening 31 which merges with oppositely directed longitudinally extending slots 32 and 33. The opening 31 is of sufficient dimension to permit passage of a bolt or the barrel portion 26 of fastener 22 therethrough and have sufficient clearance to permit the floating movement described above.

The retainers or tabs 24 and 25 are formed by separating the free ends and sides of the retainers centrally of the opening 31 and then deforming each upwardly into the generally U-shaped configuration as best seen in the cross sectional view of FIG. 3. The retainers 24 and 25 are each provided with leg portions 34 and 35, 36 and 37, respectively with the legs 34 and 36 being integral and continuous with the main body of the strip through a radiused section 38 and 39. The legs 35 and 37 are formed generally parallel to the associated leg and has the free or detached end disposed in the associated openings 32 and 33 to provide increased resistance to any twisting or torsional movement applied to the retainers 24 and 25. In the drawing, for clarity of illustration, a distinct clearance is shown between the side of the free ends of the legs 35 and 37 and the side wall of the associated openings 31 and 33. In actual practice, however, the shearing of the metal during the formation of the retainers 25 and 26, positions the opposite sides of the legs 35 and 36 substantially coextensive with the sides of the respective openings 31 and 33 in order to provide immediate engagement and resistance to any application of torque which may be applied to the retainers through the base 22 for the reasons previously noted. While each of the respective retainers have been shown and described as being U-shaped, it is intended that the equivalent shapes such as a V-shape or the like be encompassed as they are equally well suited. Each of the retainer tabs 24 and 25 may be rolled to the illustrated configuration from the retainer strip 21 during formation of the central opening or aperture in the strip.

The fastener 22, having the generally H-shaped base is then loosely received over the retainers 24 and 25 and the spring clip or equivalent retainer means 23 is positioned under the retainer tabs 24 and 25 while overlying the base 28 of the fastener 22. In this manner, the fastener is held in reasonably close proximity to the plane of the strip so that maximum resistance to torsion will be provided by the retainer tabs 24 and 25.

A modified form of the invention like that shown in FIG. 1 is found in FIGS. 5–7 with the same basic elements being provided. These are: a retainer strip 41 which floatingly mounts a fastener 42 through a spring clip 43 co-operating with retainer tabs 44 and 45. The fastener may take the same form as the fastener 22 in the preceding embodiment and in perspective view would appear as shown at 12 in FIG. 1. In the embodiment of FIGS. 5–7, retainer members 44 are formed in a somewhat different manner while providing the increased resistance to torque as described previously. Since each retainer is formed in an identical manner, description of the method of forming will be limited to one. The retainer strip 41 is severed as at 46 and 47 by forcing the retainer 44 out of the plane of the retainer strip 41.

In FIGS. 5 and 7, the severing action has been exaggerated by illustrating a gap at opposite side margins in order to better describe their formation and function. In actuality, the material will be sheared and stretched out of the plane of the retainer strip to form the raised retainer tabs 44 and 45, so the side margins of the retainers will be substantially coextensive with the portions 46 and 47. Subsequent to or simultaneously with formation of the retainer tabs, the center opening 48 may be formed by punching or the like to permit passage of the co-operating fastener.

Each of the retainer tabs 44 and 45 is of generally U-shaped configuration as was described above including leg portions 50 and 51 both of which are integral with the main body of the retainer strip at their extremities through radiused sections 52 and 53. The retainer tab 45 is formed in a similar manner having leg portions 54 and 55 formed by stretching the metal of the retainer strip upwardly therefrom at the desired distance.

After formation of the retainer tabs 44 and 45, co-operating slots 57 and 58 on the base 56 of the fastener 42 are loosely interfitted therewith. The split retainer spring 43 is then positioned under the retainer tabs 44 and 45 in overlying engagement to the flange 56 to hold the fastener adjacent the retainer strip with the tabs 44 and 45 floatingly retaining the same against rotation relative thereto.

In either of the foregoing embodiments, different types of retainer springs may be used. For example, a separate cross pin in each retainer tab may be used in lieu of the truncated diamond shape split retainer spring shown. In any event, it is desired that the retainer spring or its equivalent maintain the flange or base of the fastener closely adjacent the plane of the retainer strip within certain tolerances whereby the torque resistance may be readily predetermined and controlled for any given strip.

Retainer strips made in accordance with the principles of the present invention provide high resistance to torque which is normally generated in fastening and unfastening. It is obvious that the retainer strip may be formed to any desired shape such as will conform with the shape or outline of the parts fastened, such as an engine mounting support or the like. In performing the holding function for the fastener, suitable air or electrical driven tools may be used to set the co-operating fastener when co-operating parts are fastened. The present design permits the retainer strip to be made lightweight since resistance to torque over former designs is increased by the novel shape of the retainer tabs. In each of the embodiments shown, distinct advantages are presented in the form of economy and manufacture, ease of replaceability and simplicity in assembly. These advantages combined with the reduction in weight while maintaining the sufficient torsional holding power provides a unique design which was heretofore unknown.

From the foregoing it will become obvious that other modifications may be made without departing from the inventive concepts embodied herein and only such limitations should be imposed as are indicated by the spirit and scope of the appended claims.

I claim:
1. A high torque fastener mounting means particularly adapted for use in joining structural members and the like together comprising a fastener retainer strip, an aperture in said strip, two retainer tabs deformed out of said strip adjacent said aperture, each of said retainer tabs projecting generally upward from the plane of said strip and being reversely bent and extending back into the plane of said strip, a fastener having a base portion with slots at opposite ends thereof, said slots dimensioned for loose inter-engagement with the upward projecting and reversely bent part of said retainer tabs to permit limited movement of said fastener laterally and longitudinally of said strip while maintaining said fastener positioned generally within the limits defined by said aperture in said strip, and retainer means co-operating with the underside of said retainer tabs and overlying a part of said base portion to prevent withdrawal of said fastener in a direction generally perpendicular to said face on said strip thereby retaining said slots floatingly engaged with said retainer tabs to hold said fastener against rotation, said reversely bent retainer tabs providing increased resistance to torque.

2. The fastener mounting means of claim 1 wherein each of said retainer tabs is joined to said strip at one side.

3. The fastener mounting means of claim 1 wherein each of said retainer tabs has the upwardly projecting and reversely curled portions joined to the retainer strip.

4. In a fastening system having an elongated strip, an aperture in said strip formed by deforming retainer tabs out of said strip, each of said tabs having a portion projecting above the face of said strip, a flanged fastener having a barrel portion and a flat base portion, said flat base portion having slots at opposite ends thereof, said slots being loosely interengaged with said retainer tabs to permit slight movement laterally and longitudinally of said strip while maintaining said barrel portion within the limits defined by said aperture in said strip, retainer means co-operating with the underside of said retainer tabs and overlying a part of said flat base portion to prevent withdrawal of said nut in a direction generally perpendicular to said face on said strip, the improvement comprising forming each of said retainer tabs in a generally U shape having leg portions of the U extending within the thickness of said strip, each of said leg portions being engageable with side portions of said slots in said flat base portion during fastening to provide increased resistance to torque.

5. A fastener strip particularly adapted for use in joining structural members and the like together comprising an elongated strip, an aperture in said strip formed by punching tabs out of said strip, each of said tabs projecting generally upwardly from the plane of said strip and being curled at their outer ends into an inverted generally U shape with both legs of the U shaped portion extending into the plane of the strip to increase resistance to torque, a fastener having a barrel portion integral with a flat base portion, said flat base portion having slots at opposite ends thereof, said slots being loosely interengaged with said tabs to permit slight movement laterally and longitudinally of said strip while maintaining said barrel portion of said nut within the limits defined by said aperture in said strip, each of said slots having a side portion thereof engageable with an opposed side of both legs of each of said tabs during application of torque to said fastener whereby both of said legs on each of said tabs will resist torque application, and removable retainer means extending through said U shaped tabs and overlying a part of said flat base portion to prevent withdrawal of said fastener and floatingly hold the same adjacent the plane of said strip.

6. The fastener strip of claim 5 wherein both of said legs on said U shaped portion are integral with said strip.

7. The fastener strip of claim 5 wherein one of said legs on each of said U shaped portions is integral with said strip and the other of said legs terminates in a free end portion extending at least partially through the thickness of said strip.

References Cited by the Examiner
UNITED STATES PATENTS

| | | | |
|---|---|---|---|
| 2,144,553 | 1/1939 | Simmonds | 151—41.76 |
| 2,243,923 | 6/1941 | Swanstrom | 151—41.76 |
| 2,304,107 | 12/1942 | Leisure | 151—41.76 |
| 2,469,312 | 5/1949 | Poupitch | 151—41.76 |
| 2,825,380 | 3/1958 | Reiner | 151—41.76 |

CARL W. TOMLIN, *Primary Examiner.*

M. PARSONS, JR., *Assistant Examiner.*